J. C. DREW.
CANDY COOLING PAN.
APPLICATION FILED SEPT. 8, 1916.
1,207,148.
Patented Dec. 5, 1916.
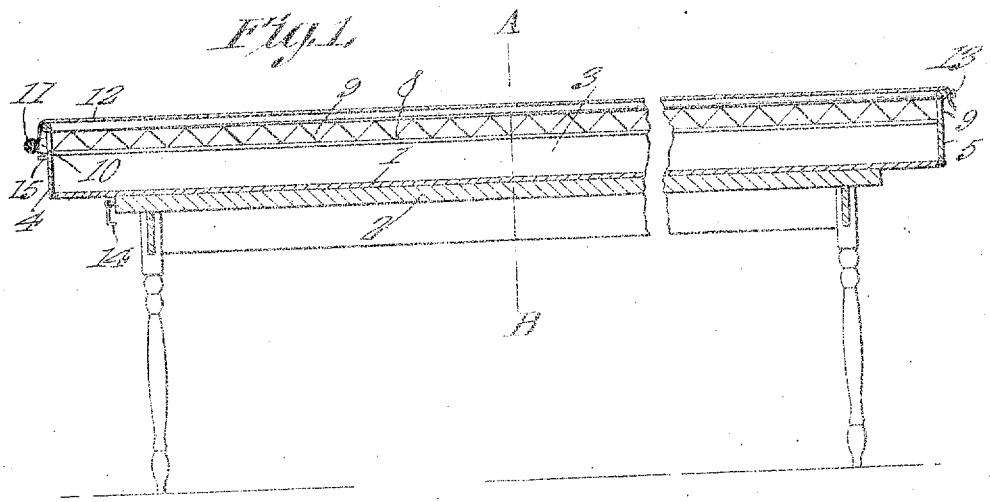
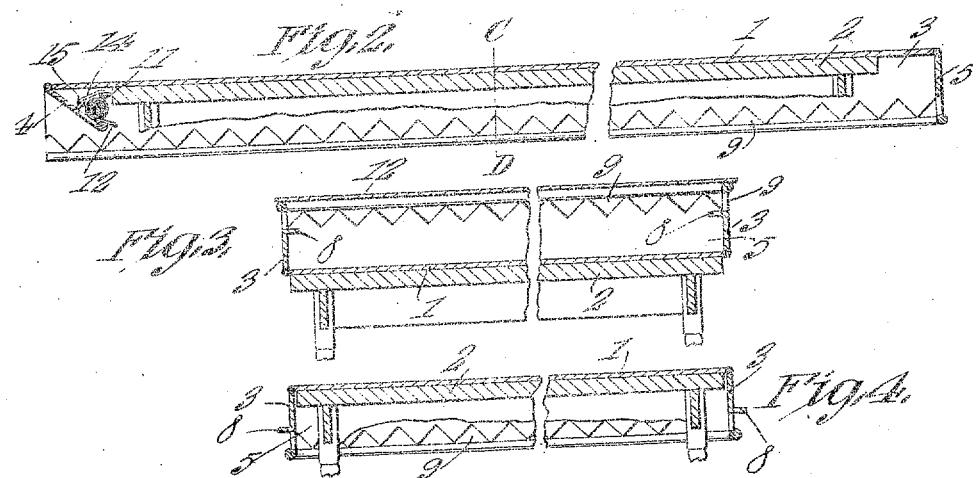
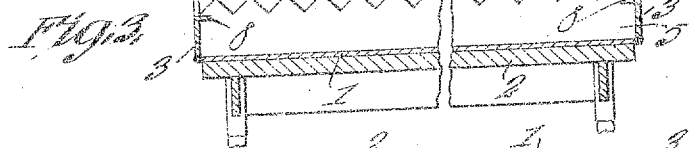
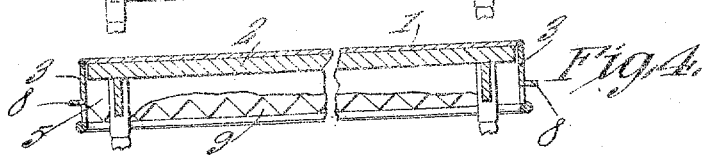
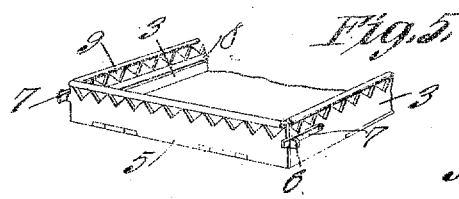
Witnesses
J. C. Drew, Inventor
by C. A. Snow & Co.
Attorneys

UNITED STATES PATENT OFFICE.

JAMES C. DREW, OF NEW ORLEANS, LOUISIANA.

CANDY-COOLING PAN.

1,207,148.  Specification of Letters Patent.  Patented Dec. 5, 1916.

Application filed September 8, 1916.  Serial No. 119,100.

*To all whom it may concern:*

Be it known that I, JAMES C. DREW, a citizen of the United States, residing at New Orleans, in the parish of Orleans and State of Louisiana, have invented a new and useful Candy-Cooling Pan, of which the following is a specification.

This invention relates to a pan for use in cooling candy.

Heretofore it has been the practice to pour the hot candy onto a slab of marble for the purpose of cooling it, but this has been found to be objectionable because it has resulted in the too rapid cooling of the candy and the consequent crumbling of the material when cold. To offset this objectionable feature, glucose or some other equivalent substance has been combined with the candy so as to act as a binder and while this has prevented crumbling, it has been found to be objectionable because it leaves the candy in a sticky condition so that it cannot be handled without soiling the fingers.

One of the objects of the present invention is to provide a candy cooling means which will retard the cooling operation and allow the material to thoroughly set while cooling so that the ultimate product will be firm and compact, and will not crumble even though made of the pure sugar without glucose or other binding means.

A further object is to provide a cooling pan the walls of which are shiftable to position where they will not interfere with the convenient cutting of the candy into sections.

A still further object is to provide improved means for retarding the cooling of the material.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a vertical longitudinal section through a cooling pan embodying the present improvements, the heat retaining means being shown in active position. Fig. 2 is a similar view through the pan, its supporting structure being removed and the walls of the pan being shown extended downwardly to the positions occupied thereby while the candy is being cut. Fig. 3 is a section on line A—B Fig. 1. Fig. 4 is a section on line C—D Fig. 2. Fig. 5 is a perspective view of one end portion of the pan.

Referring to the figures by characters of reference 1 designates the bottom of the pan, the same being preferably formed of sheet metal and being supported in any desired manner. For example, the same can be mounted on a table top 2. The bottom 1 can be of any proportions desired and in practice it has been made about seven feet long and five feet wide. Hingedly connected to each side of the bottom 1 is a side wall 3 formed of any suitable material such as wood, metal or the like, and hingedly connected to the ends of the bottom 1 are end walls 4 and 5. The walls 3, 4 and 5 are adapted to be fastened together in any desired manner, when in upstanding positions, one form of fastening means consisting of a notched finger 6 extending from each end of each end wall 4 and 5 and a notched latch 7 upon each end portion of each side wall 3 and fitting in the notched finger 6 adjacent thereto, thus to act as a means for holding the walls in proper relation to each other. Obviously, any other suitable fastening means may be employed for the purpose of holding the walls in active positions.

Formed along the inner faces of the side walls 3 are ribs 8 constituting supports for a moving strip, not shown, which is adapted to be placed at its ends on these ribs 8 and drawn longitudinally of the ribs from one end of the pan to the other after the candy has been poured onto the bottom 1, thus to smooth the top surface of the candy and insure a uniform thickness thereof throughout the length and breadth of the pan.

Formed in the side walls 3 and above the ribs 8 are openings 9 which are preferably triangular and through which air is free to circulate over the surface of the candy contained in the pan.

Extending outwardly from the end wall 4 are brackets 10 in which is journaled a shade roller 11. Secured to this roller is a cover 12 of a fabric so constructed and treated as to be capable of resisting heat and moisture. This fabric is normally wound upon the roller 11. When in use, however, the cover is unwound from the roller 11 and drawn longitudinally over the pan, it being connected to one or more buttons 13 or other suitable fastening means mounted on the wall 5. When the cover is in active position it extends throughout the width and length of the pan, thus to completely cover the contents of the pan and allow for circulation of air solely through the openings 9.

In using the apparatus herein described the hot candy is poured onto the bottom 1 after the walls 3, 4 and 5 have been set up and the candy is then smoothed by means of a straight edge drawn along the ribs 8 so that it will be of uniform thickness throughout. While the candy is still hot the cover 12 is unrolled and drawn over the pan and fastened to the walls 3. It has been found that by utilizing a cover such as shown and described, a large percentage of the heat is retained for a considerable period, inasmuch as air can circulate solely through the openings 9. By thus retarding the escape of heat and correspondingly retarding the cooling operation, it has been found in practice that the candy will cool very slowly (approximately 35 minutes being required) and as a result of this slow process, the resultant cooled product will be bound firmly together without tending to crumble when handled and without being sticky. Upon the completion of the cooling operation, the cover 12 is rewound upon its roller 11 and the walls are disconnected from each other so as to swing downwardly below the bottom 1 as shown in Fig. 2. The end wall 4 can then be swung under the end of the bottom and secured by means of a hook 14 and staple 15 or in any other desired manner, thus to protect the cover. The candy can be cut up readily into blocks, and the walls, by being suspended below the bottom, will not hamper the cutting operation.

It has been found that the cooling pan herein described is especially useful in the manufacture of peanut candy and the like such as formed in oblong blocks.

What is claimed is:—

1. Apparatus for cooling candy, comprising a bottom, walls upstanding therefrom and having openings above the surface of the candy on the bottom, and a flexible cover movable into position over the walls and the contents of the apparatus, said openings constituting the sole means for the escape of heated air, when the cover is in position.

2. Apparatus for cooling candy, including a pan made up of a bottom and apertured walls, the apertures being located above the surface of the contents of the pan, and a curtain connected to one of the walls and shiftable to position over the pan and its contents to retard the escape of heat from the pan.

3. Apparatus for cooling candy, including a pan made up of a bottom and hinged walls, means for securing the walls together when in upstanding positions, each of said walls having apertures therein above the level of the contents of the pan, and flexible means movable to position over the pan for retarding the escape of heat therefrom.

4. Apparatus for cooling candy, including a pan made up of a bottom and hinged walls, said walls having openings therein adjacent the tops thereof, means for connecting the walls together when in upstanding positions, all of said walls being movable to position below the bottom of the pan, a flexible curtain connected to one of the walls and movable to position over the pan and its contents, said curtain constituting means for retarding the escape of heat from the pan.

5. Apparatus for cooling candy, including a pan made up of a bottom and hinged walls, said walls having openings therein adjacent the tops thereof, means for connecting the walls together when in upstanding positions, all of said walls being movable to position below the bottom of the pan, a flexible curtain connected to one of the walls and movable to position over the pan and its contents, said curtain constituting means for retarding the escape of heat from the pan, and guide ledges upon the inner surfaces of opposed walls and below the openings.

6. Apparatus for cooling candy, including a pan made up of a bottom and hinged walls, said walls having openings therein adjacent the tops thereof, means for connecting the walls together when in upstanding positions, all of said walls being movable to position below the bottom of the pan, a flexible curtain connected to one of the walls and movable to position over the pan and its contents, said curtain constituting means for retarding the escape of heat from the pan, and means for securing the curtain and the wall to which it is connected, in position under one end of the bottom of the pan.

In testimony that I claim the foregoing as my own, I have hereto affixed my signature in the presence of two witnesses.

JAMES C. DREW.

Witnesses:
ARTHUR WILSON,
JOHN ALBERT.